(12) United States Patent
Ren

(10) Patent No.: US 10,732,005 B2
(45) Date of Patent: Aug. 4, 2020

(54) SYSTEM AND METHOD FOR PROVIDING MULTIMODAL VISUAL TIME AWARE GRAPHICAL DISPLAYS

(71) Applicant: Robert Bosch GmbH, Stuttgart (DE)

(72) Inventor: Liu Ren, Cupertino, CA (US)

(73) Assignee: Robert Bosch GmbH, Stuttgart (DE)

(*) Notice: Subject to any disclaimer, the term of this patent is extended or adjusted under 35 U.S.C. 154(b) by 179 days.

(21) Appl. No.: 16/068,277

(22) PCT Filed: Jan. 9, 2017

(86) PCT No.: PCT/EP2017/050310
§ 371 (c)(1),
(2) Date: Jul. 5, 2018

(87) PCT Pub. No.: WO2017/118753
PCT Pub. Date: Jul. 13, 2017

(65) Prior Publication Data
US 2019/0011281 A1    Jan. 10, 2019

Related U.S. Application Data

(60) Provisional application No. 62/275,276, filed on Jan. 6, 2016.

(51) Int. Cl.
*G01C 21/36*    (2006.01)
*H04W 4/021*    (2018.01)

(52) U.S. Cl.
CPC ..... *G01C 21/3682* (2013.01); *G01C 21/3602* (2013.01); *G01C 21/3655* (2013.01); *G01C 21/3694* (2013.01); *H04W 4/021* (2013.01)

(58) Field of Classification Search
CPC ............ G01C 21/3682; G01C 21/3602; G01C 21/3655; G01C 21/3694
USPC .......................................................... 701/533
See application file for complete search history.

(56) References Cited

U.S. PATENT DOCUMENTS

| | | | |
|---|---|---|---|
| 9,626,642 B2* | 4/2017 | Davidson | G06Q 10/083 |
| 2013/0218463 A1* | 8/2013 | Howard | G01C 21/3682 |
| | | | 701/533 |
| 2014/0357295 A1* | 12/2014 | Skomra | G06Q 10/08 |
| | | | 455/456.1 |
| 2019/0011281 A1* | 1/2019 | Ren | H04W 4/021 |

FOREIGN PATENT DOCUMENTS

| EP | 2 541 484 A1 | 1/2013 |
|---|---|---|
| EP | 2 899 507 A1 | 7/2015 |

OTHER PUBLICATIONS

International Search Report corresponding to PCT Application No. PCT/EP2017/050310, dated May 3, 2017 (3 pages).

* cited by examiner

*Primary Examiner* — Yazan A Soofi
(74) *Attorney, Agent, or Firm* — Maginot, Moore & Beck LLP

(57) ABSTRACT

A multimodal visual time aware graphical display system provides point of interest inquiry controllable and dynamic graphical effects on visualization such that when time and traffic condition aware graphics is enabled. The system processes traffic information based on current and past traffic data and visualize the geographical boundaries.

16 Claims, 2 Drawing Sheets

SYSTEM AND METHOD FOR PROVIDING MULTIMODAL VISUAL TIME AWARE GRAPHICAL DISPLAYS

CROSS-REFERENCE TO RELATED APPLICATION

This application is a 35 U.S.C. § 371 National Stage Application of PCT/EP2017/050310, filed on Jan. 9, 2017, which claims the benefit, under 35 U.S.C. § 119(e), of U.S. Provisional Patent Application Ser. No. 62/275,276, filed Jan. 6, 2016, the contents of which are hereby incorporated by reference in their entirety.

FIELD

This disclosure relates generally to the field of user information and user assistance systems and, more specifically, to systems and methods that provide multimodal visual time aware graphical displays to a vehicle operator for mapping and navigation applications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a system for providing multimodal visual time aware graphical display, the system comprises a user input and output device that includes a display and a processor that executes computer-executable instructions associated with at least one of an environment data collection device or an online information source. The instructions cause the machine to receive environmental data from at least one of the environment data collection device or the online information source in response to queries from a user input, generate a time-aware geo-fence in association with environmental data and a point of interest, and output on the display a map that includes parameters associated with the time-aware geo-fence. The environment data collection device generates the environment data corresponding to a vehicle and environment around the vehicle. In one embodiment, the environment data collection device comprising a sensor device mounted on the vehicle. In another embodiment, the environment data collection device is a network device, wherein the network device receives the environment data from the online information source in response to queries from the user input. The system further comprises a memory for storing map data that is corresponded to at least one of a virtual environment, texture data, environment lighting data, weather conditions and seasonal effects data, a set of control parameters, or a set of rendering parameters.

According to another exemplary embodiment of the disclosure, a method for providing multimodal visual time aware graphical display, the method comprises receiving, by a processor, environmental data from at least one of an environment data collection device or an online information source in response to queries from a user input; generating, by the processor, a time-aware geo-fence in association with environmental data and a point of interest; and outputting, by the processor, on a display a map that includes parameters associated with the time-aware geo-fence. The environment data collection device generates the environment data corresponding to a vehicle and environment around the vehicle. The environment data collection device comprising a sensor device mounted on the vehicle. The environment data collection device is a network device, wherein the network device receives the environment data from the online information source in response to queries from the user input. The memory for storing map data that is corresponded to at least one of a virtual environment, texture data, environment lighting data, weather conditions and seasonal effects data, a set of control parameters, or a set of rendering parameters is provided.

DETAILED DESCRIPTION

Figure 1:
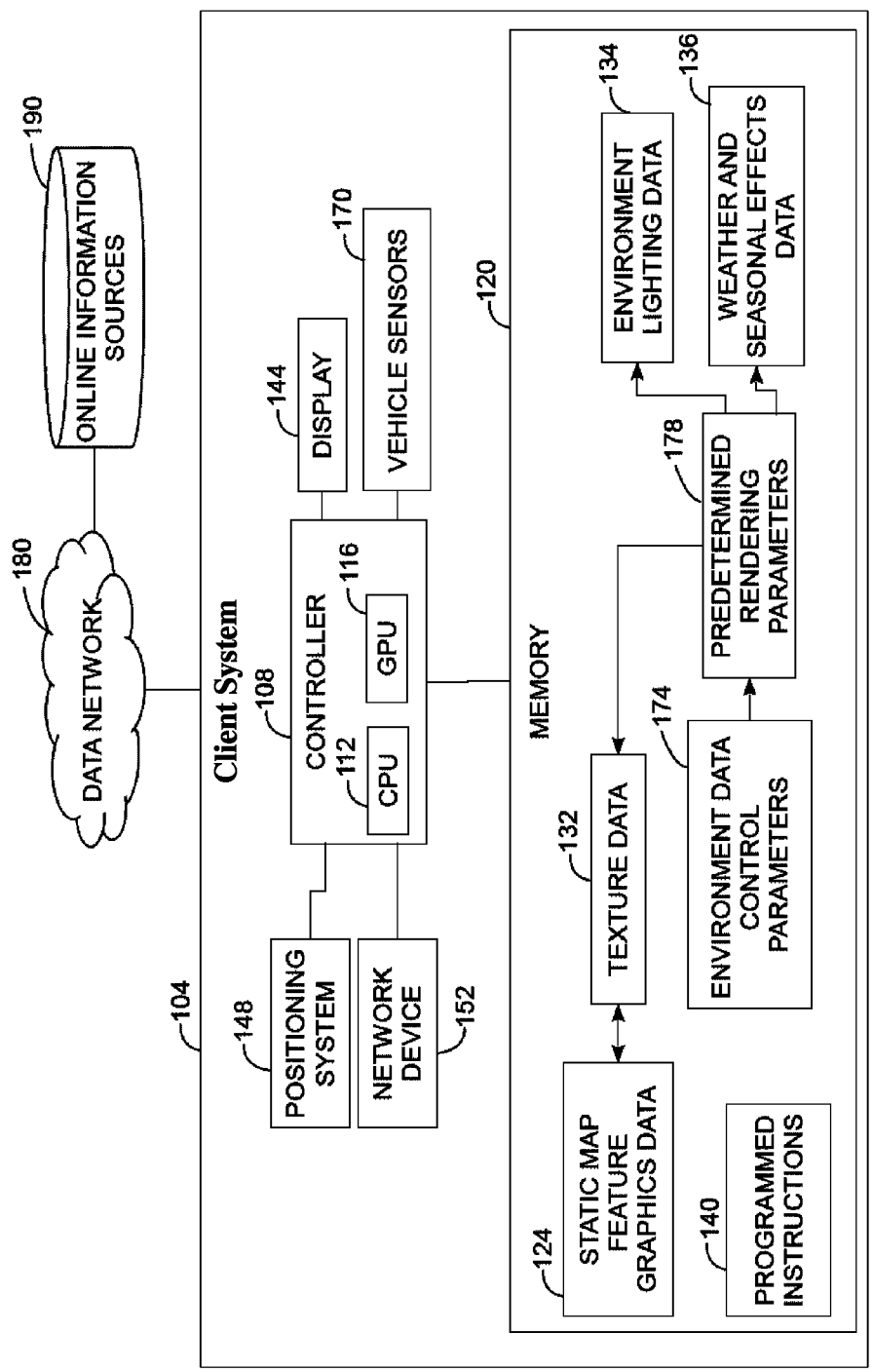
FIG. 1 is a schematic diagram of an exemplary embodiment of a multimodal visual time aware graphical display system.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "map feature" refers to any graphic corresponding to a physical location that is displayed on a map. Map features include both natural and artificial structures including, but not limited to, natural terrain features, roads, bridges, tunnels, buildings, and any other artificial or natural structure. Some mapping systems display map features using 2D graphics, 3D graphics, or a combination of 2D and 3D graphics. Some map features are displayed using stylized color graphics, monochrome graphics, or photo-realistic graphics.

As used herein, the term "in-vehicle information system" refers to a computerized system that is associated with a vehicle for the delivery of information to an operator and other occupants of the vehicle. An in-vehicle information system is also referred to as a driver assistance system or driver information system. In motor vehicles, the in-vehicle information system is often physically integrated with the vehicle and is configured to receive data from various sensors and control systems in the vehicle. In particular, some in-vehicle information systems receive data from navigation systems including satellite-based global positioning systems and other positioning systems such as cell-tower positioning systems and inertial navigation systems. Some in-vehicle information system embodiments also include integrated network devices, such as wireless local area network (LAN) and wide-area network (WAN) devices, which enable the in-vehicle information system to send and receive data using data networks. Data may also come from local data storage device. In an alternative embodiment, a mobile electronic device provides some or all of the functionality of an in-vehicle information system. Examples of mobile electronic devices include smartphones, tablets, notebook computers, handheld GPS navigation devices, and any portable electronic computing device that is configured to perform mapping and navigation functions. The mobile electronic device optionally integrates with an existing in-vehicle information system in a vehicle, or acts as an in-vehicle information system in vehicles that lack built-in navigation capabilities including older motor vehicles, motorcycles, aircraft, watercraft, and many other vehicles including, but not limited to, bicycles and other non-motorized vehicles.

As used herein, the term "environment data" includes any data that an in-vehicle information system receives from in-vehicle sensors or external sources in different vehicle embodiments that pertain to environment conditions in the environment that is external to the vehicle. Some environment data pertains to the environment conditions in a region that is proximate to the vehicle, such as data received from the vehicle sensors 170, while other data pertains to a larger region around the vehicle, such as a weather map of a city or state. The term "weather condition" refers to types of environment data that correspond to the weather in a region external to the vehicle. Examples of weather conditions include clear or overcast ambient light conditions, ambient light based on the position of the sun or moon, presence or absence of precipitation, wind direction and speed, the temperature, and the humidity. Other types of environment data pertain to various environment conditions including, but not limited to, traffic information, road construction and road closure information, location information for services and points of interest, public event information, and the like.

FIG. 1 depicts a client system 104 that generates a graphical display of a 3D virtual environment including a geographic boundaries. The client system 104 includes a controller 108, memory 120, display 144, optional positioning system 148, and optional network device 152. Hardware embodiments of the client system 104 include, but are not limited to, personal computer (PC) hardware, embedded system hardware including embedded computing hardware for use in a motor vehicle, and mobile electronic devices including smartphone and tablet computing devices.

In the client system 104, the controller 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device. In one embodiment, the CPU is a commercially available central processing device that implements an instruction set such as one of the x86, ARM, Power, or MIPS instruction set families. The GPU includes hardware and software for display of both 2D and 3D graphics. In one embodiment, controller 108 executes software drivers and includes hardware functionality in the GPU 116 to generate 3D graphics using the OpenGL, OpenGL ES, or Direct3D graphics application programming interfaces (APIs). For example, the GPU 116 includes one or more hardware execution units that implement, fragment shaders, and vertex shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications.

The controller 108 executes the mapping and navigation program and generates 3D graphical output with graphical transformations that depict map features in an environment around the vehicle with lighting and other graphical effects that depict the appearance of the physical environment around the vehicle in an intuitive manner. The controller 108 is configured with software and hardware functionality by storing programmed instructions in one or memories operatively connected to the controller and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the client system 104. In addition to the programmed instructions 140, the memory 120 includes map data corresponding to a virtual environment 124, texture data 132, environment lighting data 134, weather conditions and seasonal effects data 136, a set of control parameters 174, and a set of predetermined rendering parameters 178.

As used herein, the term "map data" as depicted in the stored map data 124 refers to geographic data and graphics data corresponding to roads, structures, natural terrain features, and any relevant geographic data pertaining to the physical environment around the vehicle that does not change frequently during operation of the client system 104. For example, buildings and other structures static map data 124 of the virtual environment include a plurality of models for three-dimensional structures that are formed from multiple polygons. The structure data include vertices with three-dimensional coordinates that define a series of interconnected polygons, such as triangles, that form the shape of a structure in the 3D virtual environment. The map data 124 are also referred to as "static map data" because the map feature data remains substantially unchanged under changing lighting and weather conditions. Of course, some embodiments of the client system 104 can receive periodic map data updates to incorporate long term changes to physical world buildings, roads, and other features, but the static map data do not typically change while using the client system 104. The controller 108 is configured to modify the display the virtual environment including the static map data with reference to multiple dynamic factors including the time of day, location of the vehicle, weather conditions around the vehicle, and traffic patterns around a geographic boundary.

During operation, the controller 108 receives environment data from at least one of a sensor device 170, network device 152, or the online information sources 190. The sensor device 170 may include any suitable number of sensors. The vehicle sensors or sensor device 170 and network device 152 are examples of environment data collection devices. As used herein, the term "environment data collection device" refers to any device that generates or receives environment data for use by the controller in a client system 104. The sensors 170, in some embodiments, generate environment data corresponding to the vehicle and the environment around the vehicle, while the network device 152 receives environment data from the online information sources 190 in response to queries from the client system 104. The controller 108 associates different types of environment data with one or more of the control parameters 174. The controller 108 identifies one more of the predetermined rendering parameters 178 that correspond to the identified control parameters to apply time-aware geofencing transformations to the depiction of the map features. In embodiment, the depiction of the map features may be in the form of a 3D virtual environment. For example, the controller 108 processes the current and past traffic data from the online information sources 190 to identify traffic intensity and generates a plurality of color level measurement based on a point of interest received from a user input in any forms of input, such as circle around a point of interest on a map, speak into an acoustic transducer, type a request in text form into the system, and the like. The controller 108 then transmit the information to a display screen 144 for display.

As depicted in FIG. 1, the online information sources 190 include any online service that provides data in a manner that is accessible by the client system 104 through the data network 180. For example, online information sources 190 include live weather services that provide information related to the weather around the location of interest. Another online information source 190 is an online traffic service that produces reports regarding traffic volume, accidents, and other traffic information.

The client system 104 includes an optional positioning system device 148 that is operatively connected to the controller 108. Examples of positioning systems include global positioning system (GPS) receivers, radio triangulation receivers that identify a location of the client system 104 with respect to fixed wireless transmitters, and inertial navigation systems. During operation, the controller 108 executes mapping and navigation software applications that retrieve location information from the positioning system 148 to identify a geographic location of the client system 104 and to adjust the display of the virtual environment to correspond to the location of the client information system 104. In navigation applications, the controller 108 identifies the location and movement of the client information system 104 for the generation of routes to selected destinations and display of the routes in the 3D virtual environment.

The display 144 is either an integrated display device, such as an LCD or other visual display device, which is integrated with a housing of the client system 104, or the display 144 is an external display device that is operatively connected to the client system 104 through a wired or wireless interface to receive output signals from the controller 108 to generate a display of the 3D virtual environment. In an embodiment where the client system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle.

Figure 2:
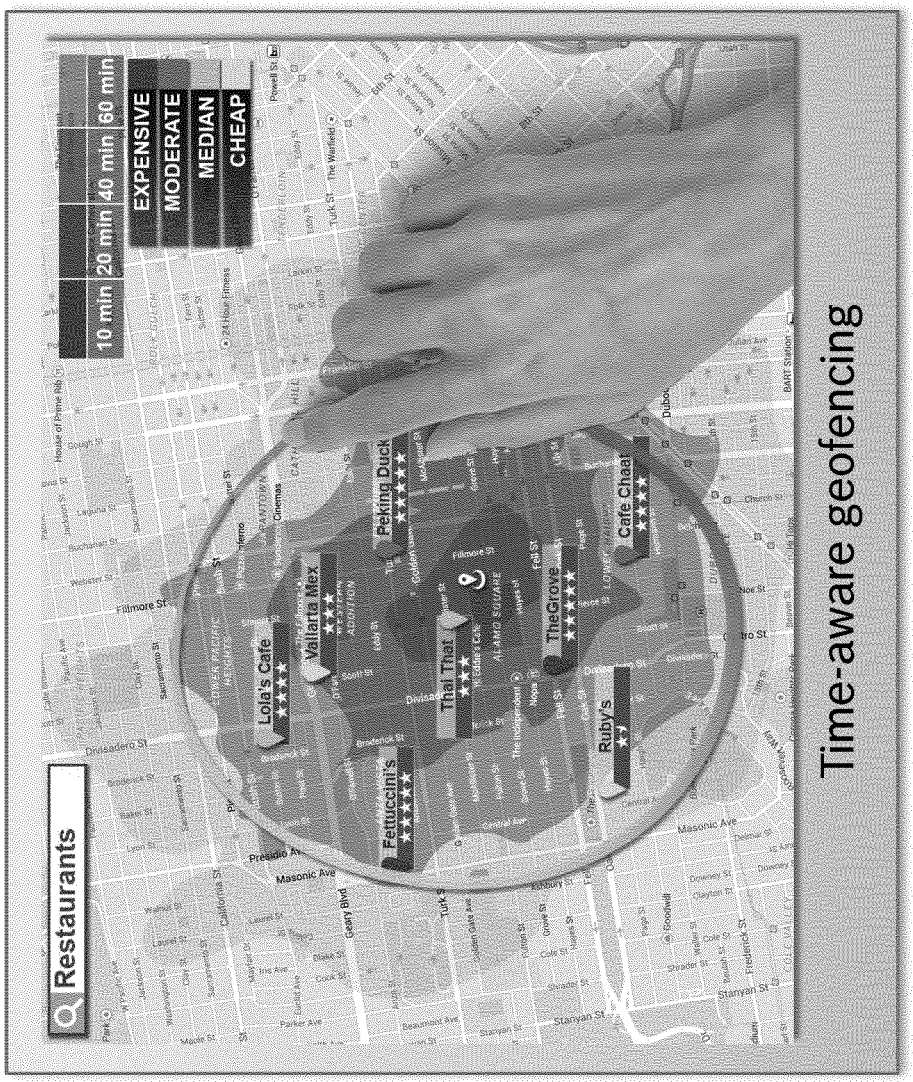
FIG. 2 is a map depicting a time-aware geofencing in accordance to a described embodiment of a disclosure.

FIG. 2 is a map depicting a time-aware geofencing in accordance to a described embodiment of a disclosure. In the map, various color level measurements are visualized based on an inquiry input by a user via a system. Based on user's input, the controller of the system as described above in FIG. 1 receives data from the online information sources through a network device. The controller associates different types of data with one or more of the control parameters, identifies one more of the predetermined rendering parameters that correspond to the identified control parameters to apply time-aware geofencing transformations to the depiction of the map features. In embodiment, the depiction of the map features may be in the form of a 3D virtual environment. For example, the controller processes the current and past traffic data from the online information sources to identify traffic intensity and generates a plurality of color level measurement based on a point of interest received from a user input in any forms of input, such as circle around a point of interest on a map, speak into an acoustic transducer, type a request in text form into the system, and the like. The controller then transmit the information to a display screen for display as a human readable format.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A system for providing a graphical display, the system comprising:
a user input device;

a memory in which computer-executable instructions are stored; and a processor operably connected to the user input device, and to the memory, and configured to execute the computer-executable instructions to:

receive from the user input device at least one point of interest;

receive environmental data, in response to a query from the user input and output device identifying a geographical area, from an environment data collection device, the environmental data including traffic data within the identified geographic area;

generate, based upon the environmental data, a time-aware geo-fence of the identified geographical area, the time-aware geo-fence indicating a plurality of areas within the identified geographical area, each of the plurality of areas associated with a respective time range, such that navigation from a present location of the user input device to any selected location within one of the plurality of areas is possible within the respective time range associated with the one of the plurality of areas in which the selected location is located based upon the traffic data; and output on a display a map that includes the at least one point of interest and a graphical display of the time-aware geo-fence.

2. The system of claim 1, wherein:
the environment data collection device is associated with a vehicle.

3. The system of claim 2, wherein the environment data collection device comprises a sensor device mounted on the vehicle.

4. The system of claim 1 wherein the environment data collection device is a network device, wherein the network device is configured to receive the environmental data from an online information source.

5. The system of claim 1 further comprising map data stored in the memory, wherein the processor is further configured to execute the computer-executable instructions to:

associate the map data with at least one of a virtual environment, texture data, environment lighting data, and weather conditions and seasonal effects data using at least one of a set of control parameters and a set of rendering parameters; and output on the display the map with the associated at least one of the virtual environment, texture data, environment lighting data, and weather conditions and seasonal effects data.

6. The system of claim 5 wherein the map data is three dimensional map data.

7. The system of claim 1, wherein the processor is further configured to execute the computer-executable instructions to:

determine a first of the plurality of areas by determining a first area, within the identified geographical area, within which all locations can be navigated to within a first time range;

determine a second of the plurality of areas by determining a second area, within the identified geographical area, within which all locations can be navigated to within a second time range, the second area greater than and encompassing the first area;

output on the display a first boundary associated with the first determined area; and output on the display a second boundary associated with the second determined area.

8. The system of claim 7 wherein the processor is further configured to execute the computer-executable instructions to:

associate the map data with weather conditions and seasonal effects data; and output on the display the map with the associated weather conditions and seasonal effects data.

9. A method for providing a graphical display, the method comprising:

receiving, with a processor, at least one point of interest from a user input device;

receiving, with the processor, in response to a query from the user input device identifying a geographical area, environmental data from an environment data collection device, the environmental data including traffic data within the identified geographic area;

generating, by the processor, based upon the environmental data, a time-aware geo-fence of the identified geographical area, the time-aware geo-fence indicating a plurality of areas within the identified geographical area, each of the plurality of areas associated with a respective time range, such that navigation from a present location of the user input device to any selected location within one of the plurality of areas is possible within the respective time range associated with the one of the plurality of areas in which the selected location is located based upon the traffic data; and outputting, by the processor, on a display a map that includes the at least one point of interest and a graphical display of the time-aware geo-fence.

10. The method of claim 9, wherein the environment data collection device is associated with a vehicle.

11. The method of claim 10, wherein the environment data collection device comprises a sensor device mounted on the vehicle.

12. The method of claim 9, wherein the environment data collection device is a network device, wherein the network device is configured to receive the environment data from an online information source.

13. The method of claim 9 wherein map data is stored in a memory, the method further comprising:

associating the map data with at least one of a virtual environment, texture data, environment lighting data, and weather conditions and seasonal effects data using at least one of a set of control parameters and a set of rendering parameters; and outputting on the display the map with the associated least one of the virtual environment, texture data, environment lighting data, and weather conditions and seasonal effects data.

14. The method of claim 13 wherein the map data is three dimensional map data.

15. The method of claim 9, wherein generating a time-aware geo-fence further comprises:

determining a first of the plurality of areas by determining a first area, within the identified geographical area, within which all locations can be navigated to within a first time range; and determining a second of the plurality of areas by determining a second area, within the identified geographical area, within which all locations can be navigated to within a second time range, the second area greater than and encompassing the first area, wherein outputting comprises:

outputting on the display a first boundary associated with the first determined area; and outputting on the display a second boundary associated with the second determined area.

16. The method of claim 15 wherein map data is stored in a memory, the method further comprising:

associating the map data with weather conditions and seasonal effects data; and outputting on the display the map with the associated weather conditions and seasonal effects data.

* * * * *